United States Patent
Kubo et al.

(10) Patent No.: US 11,200,803 B2
(45) Date of Patent: Dec. 14, 2021

(54) INFORMATION PROVIDING METHOD AND INFORMATION PROVIDING SYSTEM

(71) Applicant: Toyota Jidosha Kabushiki Kaisha, Toyota (JP)

(72) Inventors: Chikage Kubo, Chofu (JP); Takuji Yamada, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 16/280,602

(22) Filed: Feb. 20, 2019

(65) Prior Publication Data

US 2019/0259275 A1    Aug. 22, 2019

(30) Foreign Application Priority Data

Feb. 22, 2018   (JP) .............................. JP2018-030163

(51) Int. Cl.
    *G08G 1/0967* (2006.01)
    *G07C 5/00* (2006.01)
    *G08G 1/01* (2006.01)
    *H04W 4/40* (2018.01)

(52) U.S. Cl.
    CPC ....... *G08G 1/096791* (2013.01); *G07C 5/008* (2013.01); *G08G 1/0141* (2013.01); *G08G 1/0145* (2013.01); *H04W 4/40* (2018.02)

(58) Field of Classification Search
    CPC ........... G08G 1/096791; G08G 1/0145; G08G 1/0141; G07C 5/008; H04W 4/40
    See application file for complete search history.

(56) References Cited

U.S. PATENT DOCUMENTS

| | | | |
|---|---|---|---|
| 6,988,034 B1* | 1/2006 | Marlatt | G06Q 10/02 701/468 |
| 2004/0128062 A1 | 7/2004 | Ogino et al. | |
| 2004/0252192 A1* | 12/2004 | Adachi | H04N 7/18 348/148 |
| 2006/0293819 A1 | 12/2006 | Harumoto et al. | |
| 2017/0048080 A1* | 2/2017 | Grimm | H04L 67/12 |
| 2017/0084174 A1 | 3/2017 | Suzuki | |
| 2018/0284264 A1* | 10/2018 | Chambers | G08G 1/096791 |
| 2019/0016345 A1* | 1/2019 | Kitagawa | B60W 40/09 |

FOREIGN PATENT DOCUMENTS

| | | |
|---|---|---|
| JP | 2004-118608 A | 4/2004 |
| JP | 2006344032 A | 12/2006 |
| JP | 2007-316772 A | 12/2007 |
| JP | 2010-231339 A | 10/2010 |
| JP | 2014134897 A | 7/2014 |
| JP | 2016-001432 A | 1/2016 |
| JP | 2017-123072 A | 7/2017 |

\* cited by examiner

*Primary Examiner* — Mathew Franklin Gordon
(74) *Attorney, Agent, or Firm* — Dinsmore & Shohl LLP (57) ABSTRACT

An information providing method includes: causing a first agent mounted in a first vehicle to specify information on driving of a first driver of the first vehicle; requesting, based on the information, an external device to provide information for driving support; and notifying the first driver of information indicating a deriving process of driving support information, the deriving process being acquired from the external device, and the driving support information.

7 Claims, 8 Drawing Sheets

INFORMATION PROVIDING METHOD AND INFORMATION PROVIDING SYSTEM

CROSS-REFERENCE TO RELATED APPLICATIONS

This application claims priority to Japanese Patent Application No. 2018-030163 filed on Feb. 22, 2018, which is incorporated herein by reference in its entirety including the specification, drawings and abstract.

BACKGROUND

1. Technical Field

The disclosure relates to an information providing method and an information providing system.

2. Description of Related Art

Japanese Unexamined Patent Application Publication No. 2006-344032 (JP 2006-344032 A) discloses a driving support device that determines a state of a vehicle and starts a plurality of services corresponding to the state of the vehicle. This driving support device coordinates service requests and resolves competition between service requests, for example, by giving priority to danger avoidance. Also, the driving support device proposes behavior control by determining the behavior control in accordance with control policies which each service has to commonly observe.

SUMMARY

For a driving support service, a service of allowing an interactive agent mounted in a vehicle to provide driving support information to a driver is known. When driving support information is suddenly provided to a driver from an agent, for example, when an agent notifies a driver that the driver may turn right immediately in a state in which a vehicle is traveling near a host vehicle, there is a likelihood that the driver will not be able to determine whether driving is to be performed based on the driving support information.

The disclosure provides a technique of enabling a driver to easily accept driving support information which is provided when an agent provides the driving support information to the driver.

A first aspect of the disclosure provides an information providing method. The information providing method includes: causing a first agent mounted in a first vehicle to specify information on driving of a first driver of the first vehicle; requesting, based on the information, an external device to provide information for driving support; and notifying the first driver of information indicating a deriving process of driving support information and the driving support information, the information indicating the deriving process being acquired from the external device.

According to this configuration, it is possible to present the driving support information deriving process to the driver and to enable the driver to easily accept the driving support information.

A second aspect of the disclosure provides an information providing system. The information providing system includes: an agent configured to specify information on driving of a driver, and request an external device to provide information for driving support based on the information; and an output unit configured to notify the driver of a deriving process of driving support information and driving support information, the deriving process being acquired from the external device.

According to this configuration, it is possible to present the driving support information deriving process to the driver and to enable the driver to easily accept the driving support information.

According to the disclosure, it is possible to provide a technique of enabling a driver to easily accept driving support information which is provided when an agent provides the driving support information to the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
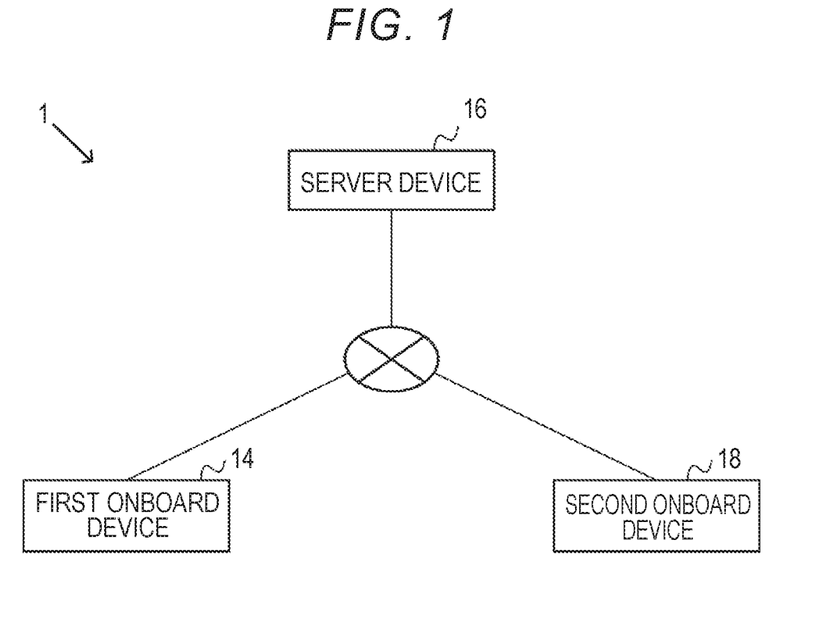
FIG. 1 is a diagram illustrating an information providing system.

FIG. 1 is a diagram illustrating an information providing system 1. The information providing system 1 includes a first onboard device 14 that is mounted in a first vehicle 10, a second onboard device 18 that is mounted in a second vehicle 12, and a server device 16.

Each of the first onboard device 14 and the second onboard device 18 has an agent. An agent is a program for exchanging information with a driver mainly by conversation, displays a character on a display of the onboard device and provides information on traveling by voice and/or an image to support a driver's driving. Driving support information which is provided by an agent includes information for calling attention such as "Please, slow down" or "Note a vehicle on the front-right side" or information for driving guidance such as "Parking lot located at XX is recommended." An agent has a conversation associated with traveling with a driver and may also have a daily conversation not associated with traveling.

In the information providing system 1, the first onboard device 14 and the second onboard device 18 transmit position information of corresponding vehicles to the server device 16. A first agent of the first onboard device 14 converses with a first driver who drives a first vehicle 10, specifies information on driving of the first driver, and requests the server device 16 to provide information for driving support based on the specified driving information of the first driver.

The server device 16 derives driving support information in response to a request from the first agent of the first onboard device 14 and transmits the driving support information to the first onboard device 14. The server device 16 uses information specified by a second agent of the second onboard device 18, for example, driving information of a second driver who drives a second vehicle 12, to derive the driving support information.

The first agent of the first onboard device 14 notifies the first driver of the driving support information derived by the server device 16 to support driving. The first onboard device 14 and the second onboard device 18 may exchange driving information without passing through the server device 16, and the first agent of the first onboard device 14 may request an external device such as the server device 16 and the second onboard device 18 to perform driving support.

Figure 2:
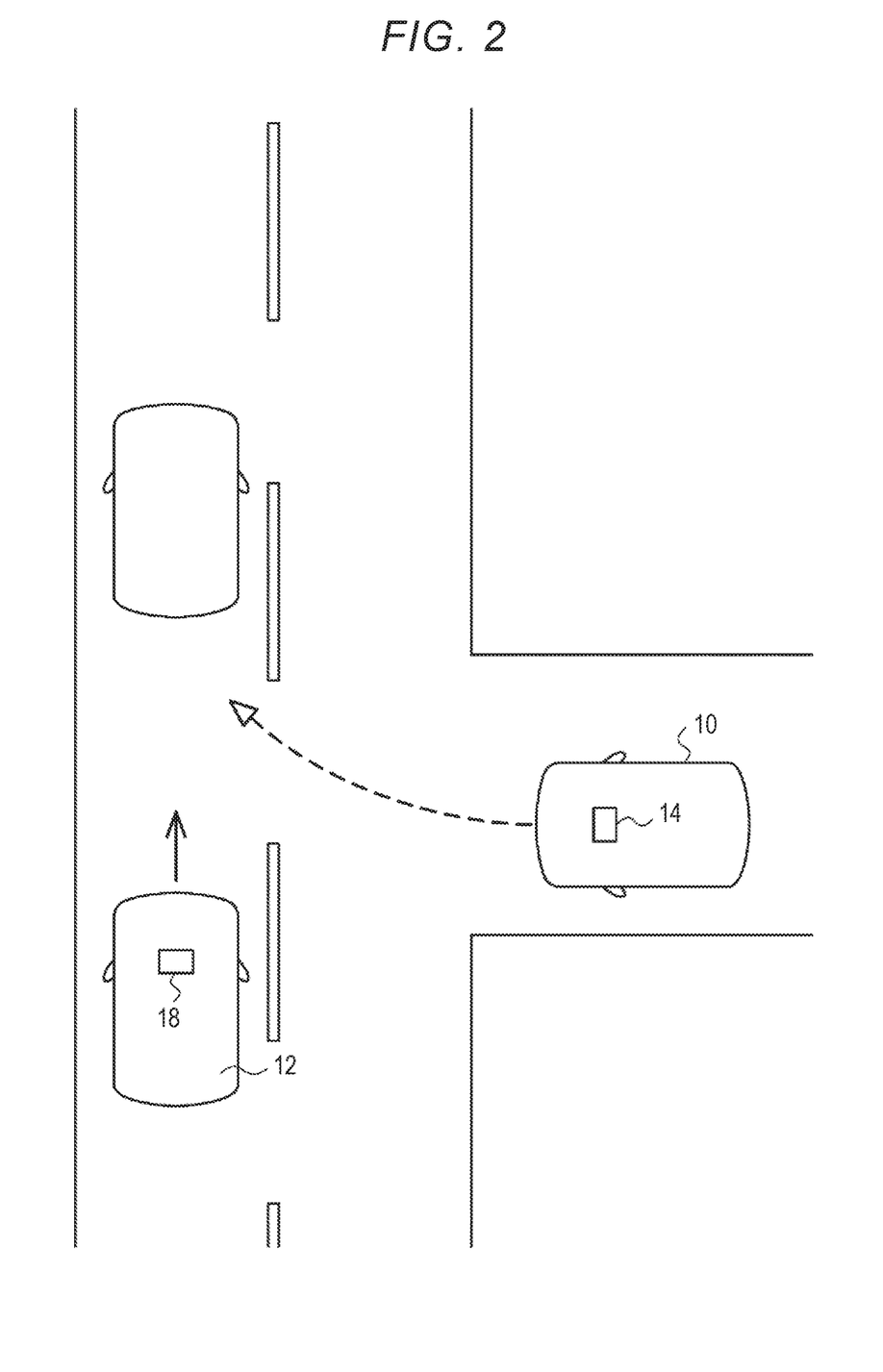
FIG. 2 is a diagram illustrating an example of driving support which is performed by the information providing system.

FIG. 2 is a diagram illustrating an example of driving support which is performed by the information providing system 1. The first agent specifies that the first vehicle 10 intends to turn right at a T-intersection from detection results from onboard sensors or destination information set in a navigation device and determines whether support of the right turn of the first driver is to be requested. The first agent transmits driving information indicating a schedule in which the first vehicle 10 will turn right and enter a traveling lane of the second vehicle 12 to the server device 16 as information on driving of the first driver who drives the first vehicle 10 and requests the server device 16 for driving support. In this way, the first agent acquires future driving information of the first driver and transmits the acquired future driving information to the server device 16.

The server device 16 receives driving information indicating a schedule for a right turn from the first agent of the first onboard device 14, transmits the driving information indicating a schedule for a right turn of the first vehicle 10 to the second agent of the second onboard device 18, and requests the second agent to provide information. The second agent of the second onboard device 18 notifies the second driver of the driving information indicating a schedule for a right turn of the first vehicle 10. In response to this notification, the second driver utters that the first vehicle 10 is allowed to pass in front of the second vehicle 12, and the second agent transmits information indicating that the right turn of the first vehicle 10 is allowed and the second vehicle 12 may stop temporarily to the server device 16 as future driving information of the second driver based on the utterance of the second driver.

The server device 16 receives driving information indicating that the second vehicle 12 may stop temporarily, derives driving support information indicating that the first vehicle 10 may turn right immediately, and transmits the driving support information to the first onboard device 14. The first agent notifies the first driver of the derived driving support information derived by the server device 16. The first driver ascertains the notified driving support information, drives to turn right, and moves the first vehicle 10 in the front of the second vehicle 12. Accordingly, the first driver can cause the first vehicle 10 to turn right and the second driver can note the right turn of the first vehicle 10.

In this way, the server device 16 can derive driving support information based on driving information received from the first agent and the second agent and support driving. On the other hand, even when the first driver is notified that the first vehicle is allowed to turn right by the first agent in the driving state illustrated in FIG. 2, why the driving support information has been derived may not be clear and thus there is concern that the driving support information may not be accepted. Therefore, in the information providing system 1 according to the embodiment, by presenting exchange of information between the agents or with the server device 16 to the driver, it is possible to allow the driver to appropriately understand the driving support information deriving process and to allow the driver to easily accept the driving support information.

The first onboard device 14 in the embodiment displays exchange of information with the server device 16 or between the agents in text on an onboard display. The first driver who has read this display can understand the process of deriving the driving support information notified by the first agent and recognize a contribution of the first agent. By displaying the process of exchanging information between the agents, it is possible to reduce a stress on the first driver which is caused by waiting for a right turn.

Figure 3:
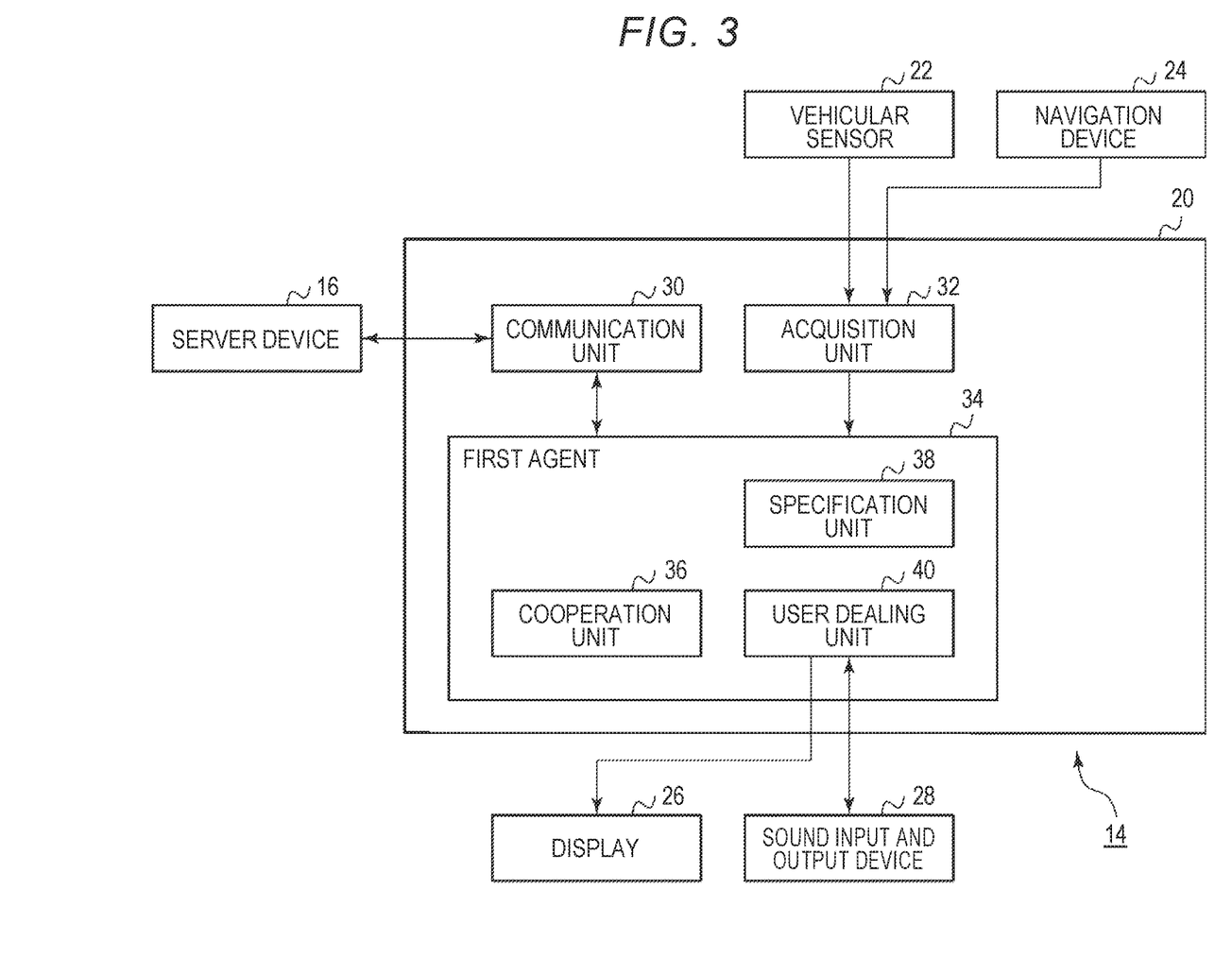
FIG. 3 is a diagram illustrating a functional configuration of a first onboard device.

FIG. 3 is a diagram illustrating a functional configuration of the first onboard device 14. In FIG. 3, elements which are illustrated as functional blocks that perform various processes can be implemented by circuit blocks, a memory, and other LSIs in hardware and can be implemented by a program loaded into the memory or the like in software. Accordingly, it will be apparent to those skilled in the art that the functional blocks can be implemented in various forms by only hardware, by only software, or by a combination thereof, and the disclosure is not limited to one thereof. The second onboard device 18 has the same functional configuration as the first onboard device 14.

The first onboard device 14 includes a control unit 20, a vehicular sensor 22, a navigation device 24, a display 26, and a sound input and output device 28. The vehicular sensor 22 includes various sensors mounted in the vehicle such as a sensor that detects an external environment and a sensor that detects a traveling status.

The sensor that detects an external environment includes a camera that captures an image near the vehicle and a radar or LIDAR that detects an object near the vehicle, and can acquire position information of another vehicle located near the vehicle based on the detection results therefrom. The sensor that detects a traveling status includes a sensor that detects a vehicle speed, a sensor that detects an acceleration, a sensor that detects an amount of steering, a sensor that detects an amount of braking, and a sensor that detects an operation of a direction indicator, and a traveling schedule or a traveling result of the vehicle is derived based on the detection results therefrom. Information acquired by the vehicular sensor 22 is sent to the control unit 20.

The navigation device 24 acquires information indicating a destination set by a driver and position information of the first vehicle 10 and sends the destination information and the position information to the control unit 20. The display 26 is fixed to a top of a center console or a dashboard and displays an image to provide information to the driver.

The display 26 may include a head-up display that displays a display image which is a virtual image to overlap an actual scene by projecting an image in front of the driver. The head-up display is mounted in a vehicle compartment of the vehicle and projects images of a variety of information to a front windshield of the vehicle based on a control signal output from a display controller. The image is a virtual image. The virtual image projected to the front windshield is not focused on the front windshield, and is recognized by the driver as if the image were displayed outside the vehicle, and appears as if it has a depth in the display on the head-up display. Accordingly, the virtual image is displayed to overlap an actual image in front of the vehicle. For example, in the driving state illustrated in FIG. 2, the first driver can easily recognize the second vehicle 12 by the first onboard device 14 being caused to project an image indicating the position of the second vehicle 12 to the front windshield.

The sound input and output device 28 includes a microphone that detects sound in the vehicle compartment and a speaker that outputs voice. The first agent realizes communication by conversation with the driver using the sound input and output device 28. The display 26 and the speaker function as an output unit that outputs information to the driver.

The control unit 20 includes a communication unit 30, an acquisition unit 32, and a first agent 34. The first agent 34 includes a cooperation unit 36, a specification unit 38, and a user dealing unit 40. The communication unit 30 transmits position information of the vehicle to the server device 16 and transmits and receives information on driving to and from the server device 16 via a network. Information which is transmitted from the communication unit 30 to the server device 16 includes position information of the first vehicle 10 and information on a traveling schedule of the first vehicle 10. Information which the communication unit 30 receives from the server device 16 includes information on a traveling schedule of another vehicle and driving support information illustrated in FIG. 2. The communication unit 30 may communicate with the second onboard device 18 by vehicle-to-vehicle communication.

The acquisition unit 32 acquires detection results from the vehicular sensor 22 and acquires destination information and position information from the navigation device 24.

The user dealing unit 40 realizes communication with the driver by recognizing an utterance of the first driver and responding to the utterance. The user dealing unit 40 outputs speech for prompting the first driver to utter or provides driving support information to the first driver in addition to responding to an utterance of the first driver. For example, the user dealing unit 40 may output speech of "Where are you going?" to prompt the first driver to utter a destination and output speech of "Drive at a decreased speed" based on vehicle speed information to support driving.

The specification unit 38 specifies information on future driving of the first driver based on external environment information, traveling status information, destination information, and position information which are acquired by the acquisition unit 32, map information which is stored in advance, and an utterance of the first driver acquired by the user dealing unit 40. For example, in the driving state illustrated in FIG. 2, the specification unit 38 specifies that the first vehicle 10 is scheduled to turn right and enter the traveling lane of the second vehicle 12 based on the traveling status information detected by the vehicular sensor 22 or the destination information. The specification unit 38 may specify a schedule for traveling of the first vehicle 10 based on an utterance of "I want to turn right" from the driver.

The specification unit 38 determines that driving support is to be requested to the server device 16 based on the information on future driving of the first driver. For example, when the driver has uttered to request driving support and there is congestion with respect to traveling of the vehicle, the specification unit 38 may determine that driving support is to be requested to the server device 16.

The cooperation unit 36 specifies information on future driving of the first driver and sends the specified information on future driving to the server device 16. The information on future driving of the first driver includes information on the traveling schedule specified by the specification unit 38 and information on the utterance acquired by the user dealing unit 40 and includes information on future driving. The information on future driving of the first driver is information indicating a traveling schedule of the first driver near the first vehicle 10 and/or the second vehicle 12. The range near the first vehicle 10 and/or the second vehicle 12 may be a range which can be detected by the vehicular sensor 22 and/or a second vehicular sensor.

The user dealing unit 40 displays an image indicating a process of transmitting and receiving driving information between the first agent 34 and the agent of the second onboard device 18, that is, a process of causing the first agent 34 to acquire driving information of the second driver, on the display 26 of the first vehicle 10. Accordingly, it is possible to allow the driver to recognize a contribution of the agent.

Figure 4:
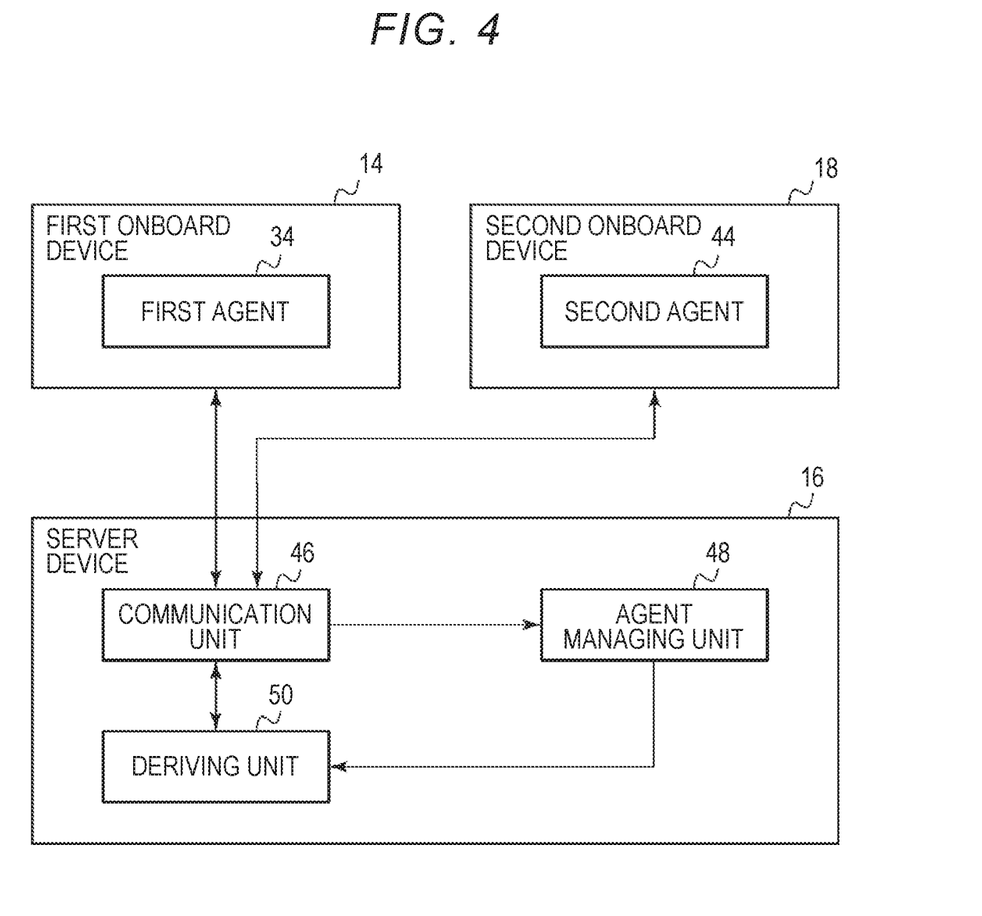
FIG. 4 is a diagram illustrating a functional configuration of a server device.

FIG. 4 is a diagram illustrating a functional configuration of the server device 16. The server device 16 includes a communication unit 46, an agent managing unit 48, and a deriving unit 50. The communication unit 46 receives position information of the vehicles from the first onboard device 14 and the second onboard device 18 and transmits and receives driving information to and from the first onboard device 14 and the second onboard device 18.

The agent managing unit 48 manages the first agent 34 and the second agent 44, and stores agent IDs and position information of the vehicles in which the agents are executed. Accordingly, the server device 16 can find an agent which is located near the first vehicle 10, that is, an agent which can comply with a request from the first vehicle 10.

The deriving unit 50 derives driving support information which is provided to the first driver based on the information on driving of the first driver specified by the first agent 34 and the information on driving of the second driver specified by the second agent 44. For example, in the driving state illustrated in FIG. 2, the deriving unit 50 receives driving information indicating that the first vehicle 10 is scheduled to turn right and driving information indicating that the second vehicle 12 has stopped temporarily and derives driving support information indicating that the first vehicle 10 may turn right immediately. The driving support information derived by the deriving unit 50 is sent to the first onboard device 14. The deriving unit 50 derives the driving support information indicating that the first vehicle 10 is going to turn right and transmits the derived driving support information to the second onboard device 18. Accordingly, the first driver can turn right immediately and the second driver can note the presence of a vehicle which is going to turn right.

The first agent 34 and the second agent 44 display exchange of driving information via the server device 16 to the drivers.

Figure 5A:
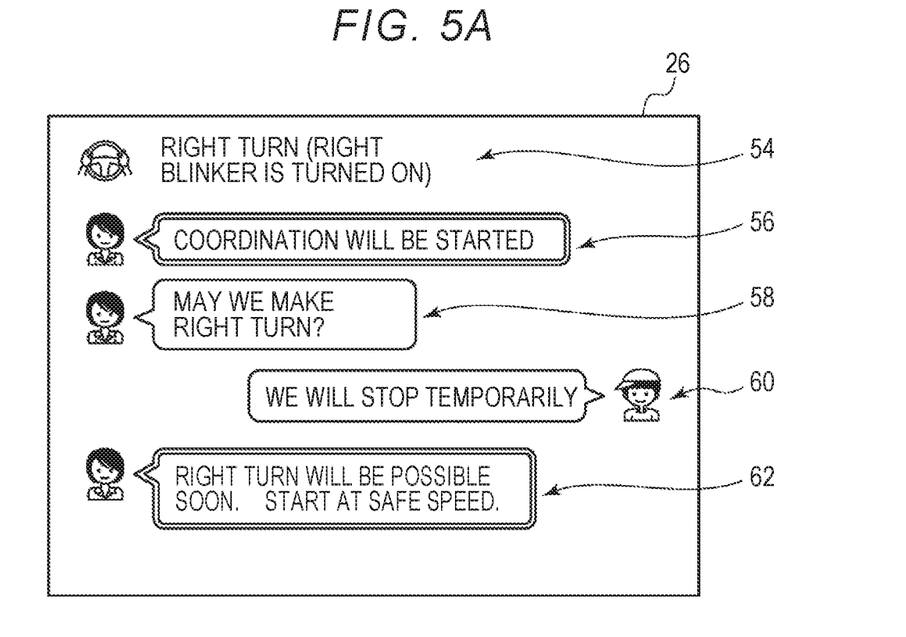
FIG. 5A is a diagram illustrating an image indicating a process of exchanging information between agents in a driving state illustrated in FIG. 2.
Figure 5B:
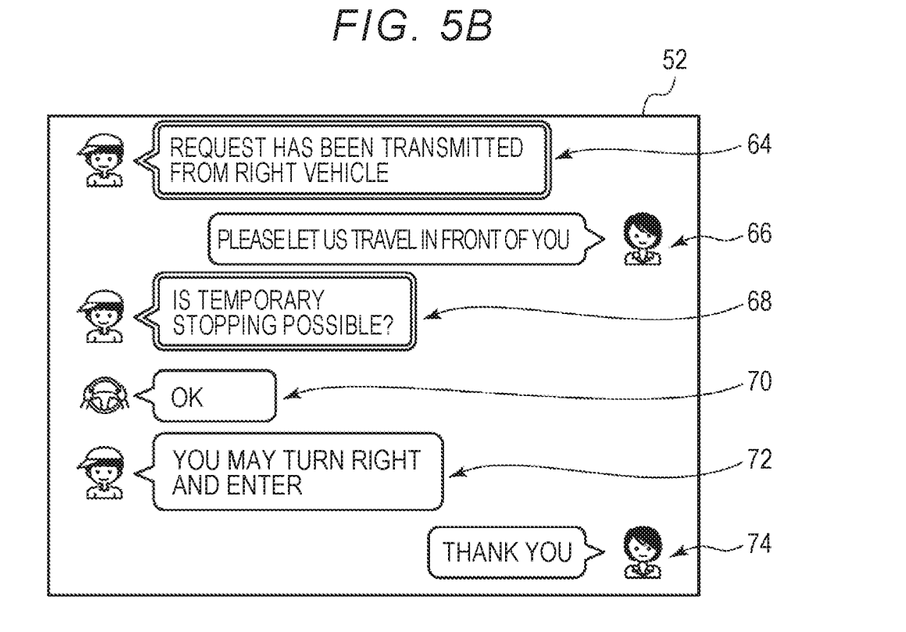
FIG. 5B is a diagram illustrating an image indicating a process of exchanging information between agents in the driving state illustrated in FIG. 2.

FIGS. 5A and 5B illustrate images indicating processes of exchanging information between the agents in the driving state illustrated in FIG. 2. FIG. 5A illustrates an image displayed on the display 26 by the first agent 34. Sequentially from the top, the image displayed on the display 26 includes a first notification 54 indicating that it has been detected that the first vehicle 10 is scheduled to turn right, a second notification 56 indicating that the first agent 34 has started coordination, a third notification 58 indicating what has been requested to the second driver of the second vehicle 12, a fourth notification 60 indicating that the second driver has accepted the request, and a fifth notification 62 indicating driving support information for the first driver. These notifications may be displayed with the elapse of time or may be updated from the top to the bottom. These notifications may be accompanied with outputting of voice at the times at which they are displayed on the display 26.

The first notification 54 indicates a traveling schedule of the first driver, and an image indicating the first driver is attached to the left end thereof. The second notification 56, the third notification 58, and the fifth notification 62 indicate operations of the first agent 34 and a character indicating the first agent 34 is attached to the left end thereof. The fourth notification 60 indicates an operation of the second agent 44 and thus a character indicating the second agent 44 is attached to the right end thereof. In this way, the characters of the first agent 34 and the second agent 44 are set in advance by the drivers, respectively, and character information of the second agent 44 is transmitted to the first onboard device 14.

In this way, the first driver can easily recognize the process of exchanging information between the agents and deriving the driving support information by glancing at the display 26, and distrust for the driving support information can be curtailed. The first driver can be caused to recognize the contribution of the first agent 34 by displaying exchange of information between the agents. By displaying the process of exchanging information between the agents, it is possible to reduce a stress on the first driver.

FIG. 5B illustrates an image which is displayed on a display 52 of the second onboard device 18 by the second agent 44. Sequentially from the top, the image displayed on the display 52 includes a first notification 64 indicating that a request has been transmitted from the first agent 34 of the first vehicle 10, a second notification 66 indicating the request from the first agent 34, a third notification 68 indicating that the second agent 44 ascertains whether or not the request has been accepted, a fourth notification 70 indicating the detection result of an utterance of the second driver, a fifth notification 72 indicating driving information which the second agent 44 has sent, and a sixth notification 74 indicating a response from the first agent 34.

By displaying exchange of information between the agents in this way, the second driver can be allowed to recognize a contribution of the second agent 44. The second driver can understand the process of exchanging information between the agents by glancing at the display 52.

Text information of the notifications illustrated in FIGS. 5A and 5B is generated by the deriving unit 50 of the server device 16, and may be generated by the first agent 34 or the second agent 44 in another aspect.

Figure 6:
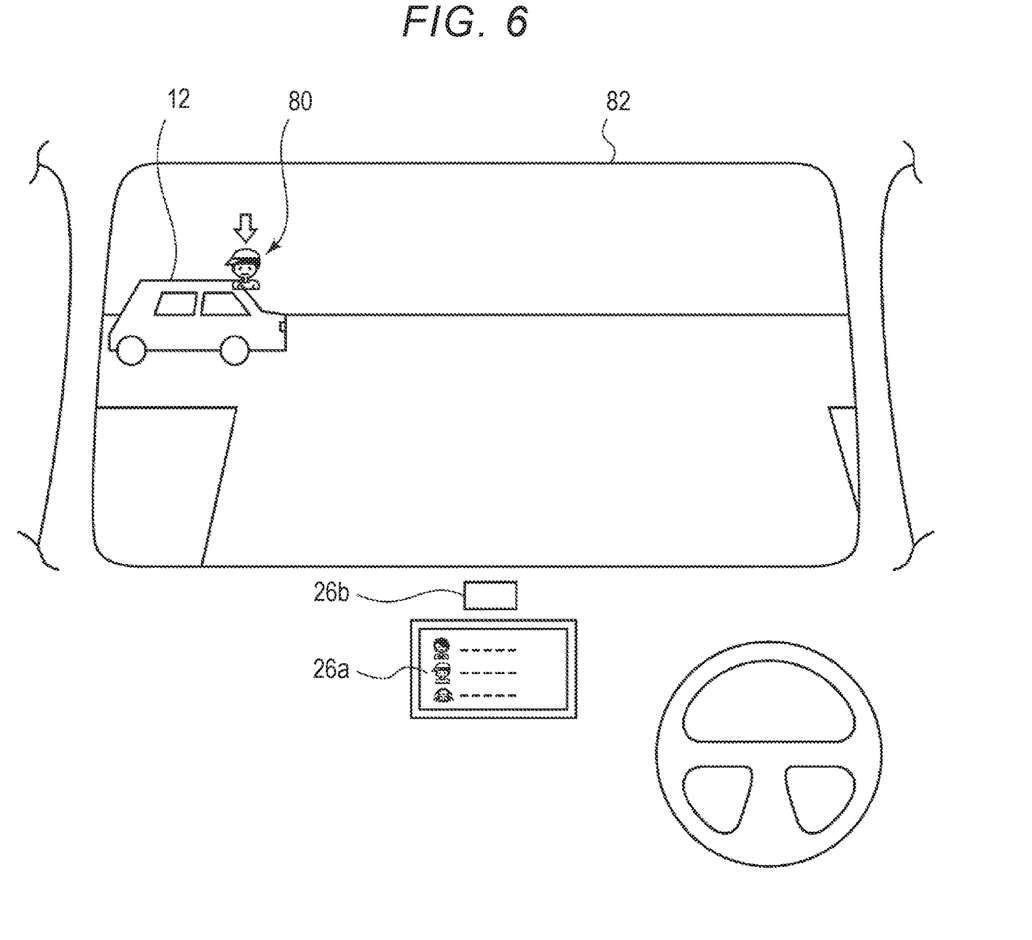
FIG. 6 is a diagram illustrating a second vehicle when seen from a first vehicle.

FIG. 6 is a diagram illustrating the second vehicle 12 when seen from the inside of the first vehicle 10. The display 26 includes a liquid crystal display 26a that is disposed on a center console or a dashboard and a head-up display 26b. The head-up display 26b may be provided on the dashboard and project an image to a front windshield 82.

The display 26 provides information indicating the position of the second vehicle 12 for the first driver when exchanging information with the second agent 44. A character image 80 of the second agent 44 is projected to overlap the second vehicle 12 which is an actual image by the head-up display 26b and the position of the second vehicle 12 is displayed to the first driver. The first onboard device 14 acquires character information of the second agent 44 from the server device 16.

Displays 26 of a plurality of types are provided, traveling schedule information of another vehicle is displayed on one display 26, and information indicating the position of the other vehicle is displayed on the other display 26. Since the character image 80 of the second agent 44 is also displayed on the liquid crystal display 26a, the first driver can easily recognize a target with which the first agent 34 exchanges information and recognize that information has been provided from the second vehicle 12.

The liquid crystal display 26a may display an overhead image including the first vehicle 10 and the second vehicle 12 at the right corner of a screen to display the position of the second vehicle 12. Driving information of the second vehicle 12 indicating the process of deriving driving support information may be displayed in text on the head-up display 26b.

Figure 7:
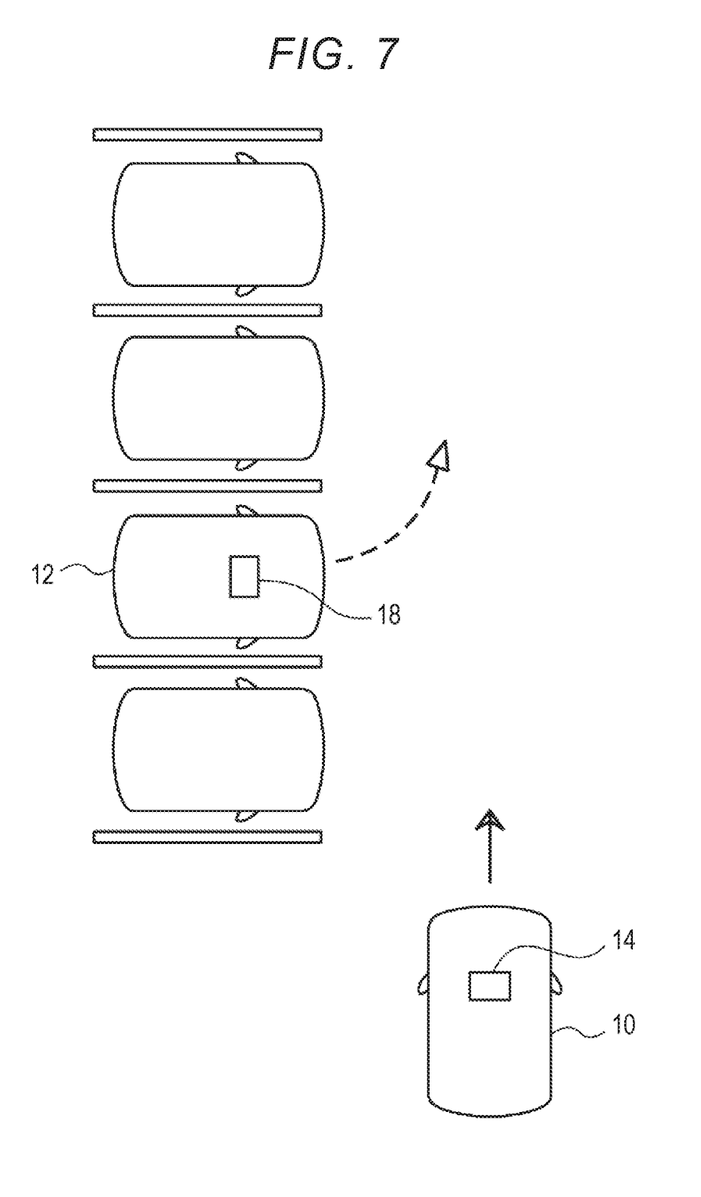
FIG. 7 is a diagram illustrating another example of driving support which is performed by the information providing system.
Figure 8:
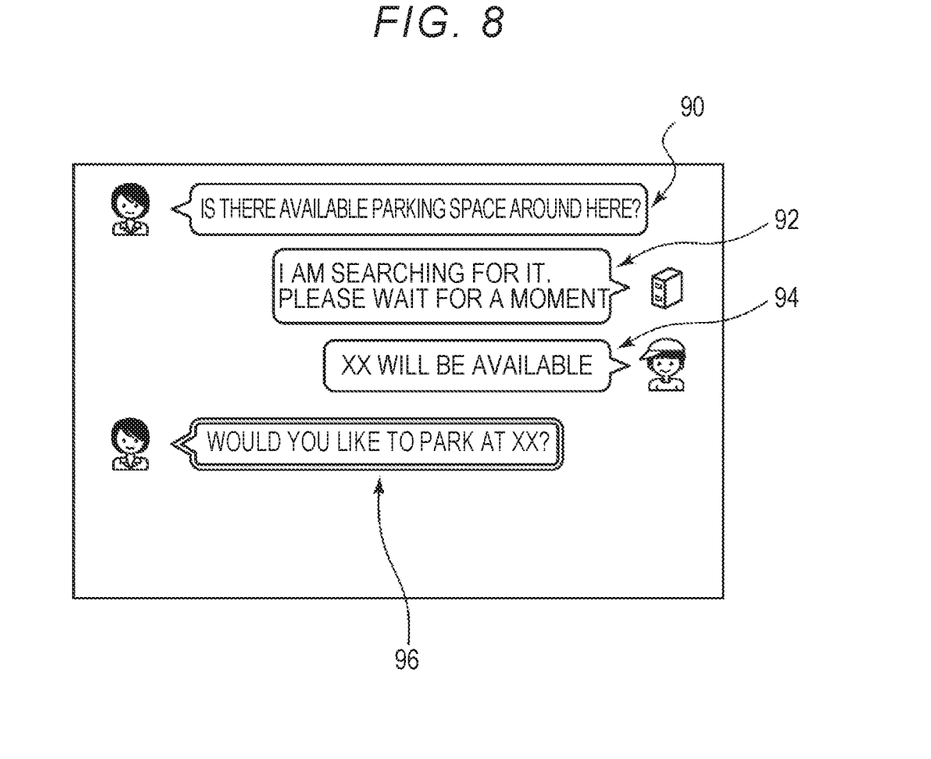
FIG. 8 is a diagram illustrating an image indicating a process of exchanging information between agents in a driving state illustrated in FIG. 7.

FIG. 7 is a diagram illustrating another example of driving support which is performed by the information providing system 1. FIG. 8 illustrates an image indicating the process of exchanging information between the agents in the driving state illustrated in FIG. 7. In FIG. 7, the first driver of the first vehicle 10 is finding a parking space in a parking lot and there is no available parking space. The first driver utters that the first driver is finding a parking space and the first agent 34 acquires the utterance and finds a parking space.

The first agent 34 transmits information for requesting a parking space and position information of the first vehicle 10 to the server device 16. The first agent 34 displays a first notification 90 of "Is there an available parking space around here?" on the display 26 such that the character of the first agent 34 utters, and notifies the first driver that the first agent 34 is finding a parking space.

The server device 16 receives information for requesting a parking space from the first agent 34, transmits information including details corresponding to the request to the first onboard device 14, and starts finding a parking space. The first onboard device 14 receives the information including details corresponding to the request from the server device 16 and the first agent 34 displays a second notification 92 of "I am searching it. Please wait for a moment." on the display 26. The second notification 92 is displayed as if a character image of the server device 16 has uttered. The server device 16 requests the second onboard device 18 of the second vehicle 12 parked near the first vehicle 10 to transmit a traveling schedule of the second vehicle 12.

The second agent 44 specifies that the second vehicle 12 is scheduled to exit from the parking space soon as information on future driving of the second driver. The second agent 44 specifies future driving information of the second driver, for example, based on the second driver's setting of a destination in a navigation device or the second driver's utterance. The second agent 44 transmits information indicating that the second vehicle 12 is scheduled to exit from the parking space soon to the server device 16.

The server device 16 acquires future driving information of the second driver specified by the second agent 44, derives driving support information indicating that the parking space at which the second vehicle 12 is located will be available soon, and transmits the derived driving support information to the first onboard device 14. The first agent 34 receives the driving support information derived from the future driving information of the second driver and displays a third notification 94 of "XX will be available" on the display 26 as if the character of the second agent 44 has uttered.

The first agent 34 acquires the driving support information derived by the server device 16, and displays the driving support information on the display 26 and outputs the driving support information by voice to provide the driving support information to the first driver. The first agent 34 displays a fourth notification 96 of "Would you like to park at XX?" as if the character of the first agent 34 has uttered to the display 26. The head-up display 26b may display the position of the second vehicle 12, that is, the parking space which will become available soon, using an arrow or the like. Accordingly, the first agent 34 can find a parking space of the first driver to support driving and the first driver can be allowed to recognize the contribution of the first agent 34 to finding the parking space.

The second agent 44 may not notify the second driver that the future driving information of the second driver has been transmitted to the server device 16. By preventing information not serving for driving support of the second driver from being transmitted to the second driver, it is possible to decrease a notification frequency.

Information which is provided from the second onboard device 18 to the server device 16 is not limited to the future driving information of the second driver and an image captured by an onboard camera may simply be transmitted. The server device 16 can derive information of an available parking space, that is, driving support information for the first vehicle 10, from the image captured by the onboard camera of the second vehicle 12. In this way, information acquired by the second onboard device 18 of the second vehicle 12 is provided to the server device 16, and driving support information for the first driver is derived based on the information provided from the second vehicle 12.

The above-mentioned embodiment is merely an example and it will be understood by those skilled in the art that combinations of the elements can be modified in various forms and the modifications are also included in the scope of the disclosure.

What is claimed is:

1. An information providing method comprising:
   causing a first agent mounted in a first vehicle to specify information on driving of a first driver of the first vehicle;
   requesting, based on the information, a second agent to provide information for driving support; and
   displaying, to the first driver, information indicating why driving support information was derived and the driving support information, the information indicating why the driving support information was derived being acquired from the second agent and comprising first information transmitted from the first agent to the second agent and second information transmitted from the second agent to the first agent.

2. The information providing method according to claim 1, further comprising:
   presenting information indicating a position of a second vehicle to the first driver, wherein
   the driving support information is based on information of the second vehicle, the driving support information being specified by the second agent mounted in the second vehicle.

3. The information providing method according to claim 1, further comprising:
   acquiring information of a second vehicle from a server device and displaying, to the first driver, the information of the second vehicle.

4. The information providing method according to claim 1, further comprising:
   displaying the information indicating why driving support information was derived in text on a display.

5. The information providing method according to claim 3, further comprising:
   a process of exchanging the information between the first agent and the second agent mounted in the second vehicle.

6. An information providing system comprising:
   an agent configured to
      specify information on driving of a driver, and
      request a second agent to provide information for driving support based on the information; and
   an output unit configured to display, to the driver, information indicating why driving support information was derived and driving support information, the information indicating why the driving support information was derived being acquired from the second agent and comprising first information transmitted from the agent to the second agent and second information transmitted from the second agent to the agent.

7. An information providing method comprising:
   causing a first agent mounted in a first vehicle to specify information on driving of a first driver of the first vehicle;
   causing a second agent mounted in a second vehicle to specify information on driving of a second driver of the second vehicle;
   deriving driving support information which is provided to the first driver based on the information on driving of the first driver specified by the first agent and the information on driving of the second driver specified by the second agent;
   displaying, to the first driver, information indicating why the driving support information was derived and the driving support information, the information indicating why the driving support information was derived being acquired from the second agent and comprising first information transmitted from the first agent to the second agent and second information transmitted from the second agent to the first agent; and
   presenting information indicating a position of the second vehicle to the first driver, wherein the driving support information is based on information of the second vehicle, the driving support information being specified by a second agent mounted in the second vehicle.

* * * * *